(12) United States Patent
Malkov

(10) Patent No.: US 7,628,150 B2
(45) Date of Patent: Dec. 8, 2009

(54) VERSATILE FLEXIBLE MAT AND METHOD OF IMPLEMENTING AND USING SAME

(76) Inventor: Vladimir Malkov, 260 Bay 20, Brooklyn, NY (US) 11241

( * ) Notice: Subject to any disclaimer, the term of this patent is extended or adjusted under 35 U.S.C. 154(b) by 0 days.

(21) Appl. No.: 11/840,441

(22) Filed: Aug. 17, 2007

(65) Prior Publication Data
US 2009/0044934 A1    Feb. 19, 2009

(51) Int. Cl.
*F23L 9/00* (2006.01)
(52) U.S. Cl. .................. 126/271.1; 126/271.2 A; 126/343.5 R; 165/103; 165/45; 404/77; 404/72
(58) Field of Classification Search .......... 126/271.1, 126/271.2 A, 343.5 R; 165/103, 45, 46, 189; 37/227; 237/69; 404/77, 72; 219/213; 392/379
See application file for complete search history.

(56) References Cited

U.S. PATENT DOCUMENTS

| | | | | |
|---|---|---|---|---|
| 3,298,290 | A * | 1/1967 | Du Fresne | 404/72 |
| 3,990,502 | A * | 11/1976 | Best | 165/45 |
| 4,258,248 | A | 3/1981 | Campo | |
| 4,279,244 | A * | 7/1981 | McAlister | 126/621 |
| 4,646,818 | A * | 3/1987 | Ervin, Jr. | 165/103 |
| 4,967,057 | A | 10/1990 | Bayless et al. | |
| 5,003,157 | A | 3/1991 | Hargrove | |
| 5,291,000 | A | 3/1994 | Hornberger | |
| 5,380,988 | A | 1/1995 | Dyer | |
| 5,591,365 | A | 1/1997 | Shields | |
| 5,637,247 | A | 6/1997 | Flynn, Jr. | |
| 5,718,221 | A * | 2/1998 | Lobato | 126/343.5 R |
| 5,854,470 | A | 12/1998 | Silva | |
| 5,857,646 | A * | 1/1999 | Taricco | 244/134 R |
| D406,000 | S | 2/1999 | Hartranft | |

(Continued)

FOREIGN PATENT DOCUMENTS

JP    2005220638    8/2005

(Continued)

OTHER PUBLICATIONS http://www.alibaba.com/catalog/11855399/Snow_Melting_Mat_Cables.html, Snow Melting Mat & Cables, printed from the Internet on Aug. 17, 2007, 3 pages.

(Continued)

*Primary Examiner*—Steven B McAllister
*Assistant Examiner*—Avinash Savani
(74) *Attorney, Agent, or Firm*—Alexey Bakman, Esq.

(57) ABSTRACT

A flexible heating mat is provided. The mat comprises a plurality of sections, connected to each other by arch ribs. The arch ribs form a flexible, preferably raised, ceiling and a closed space above the precipitation-covered surface. Each section comprises a tube, capable of conducting a melting substance therethrough and dissipating it through at least one jet for melting of ice and/or drying of moisture. In other embodiments, the mat comprises at least one snow-mashing member. The mat may further comprise a pump for pumping out the melt and/or recycling the melting medium. Other embodiments are provided, and each of the embodiments described herein can be used alone or in combination with one another. The method of using the mat is also described and claimed.

19 Claims, 3 Drawing Sheets

U.S. PATENT DOCUMENTS

| | | | |
|---|---|---|---|
| 6,180,929 B1 | 1/2001 | Pearce | |
| 6,182,903 B1 * | 2/2001 | Fiedrich | 237/69 |
| 6,184,496 B1 | 2/2001 | Pearce | |
| 6,211,493 B1 | 4/2001 | Bouman | |
| 6,278,085 B1 | 8/2001 | Abukasm | |
| 6,483,086 B1 | 11/2002 | Wolff et al. | |
| 6,609,074 B2 | 8/2003 | Shteinhauz | |
| 6,696,674 B1 | 2/2004 | Doornsbosch | |
| 6,855,915 B2 | 2/2005 | Gehring | |
| 6,987,928 B2 | 1/2006 | Shields | |
| 7,180,033 B2 | 2/2007 | Morgandi | |
| D542,070 S | 5/2007 | Richardson | |
| 2002/0040895 A1 | 4/2002 | Lopez et al. | |
| 2002/0106480 A1 | 8/2002 | Vallieres | |
| 2003/0054132 A1 | 3/2003 | Maupin | |
| 2005/0029403 A1 | 2/2005 | Bourgault | |
| 2005/0254802 A1 | 11/2005 | Shields | |
| 2006/0272631 A1 * | 12/2006 | Coke et al. | 126/271.2 A |
| 2006/0289468 A1 | 12/2006 | Seibert et al. | |

FOREIGN PATENT DOCUMENTS

JP            2005220638 A  *  8/2005

OTHER PUBLICATIONS http://www.warmzone.com/snow-melting-mats.asp, Warmtrax Portable Snow Removal System, printed from the Internet on Aug. 17, 2007, 2 pages.

http://www.heatersplus.com/heattrakmat.htm, HeatTrak Portable Residential and Industrial Snow Melting Traction Mat, printed from the Internet on Aug. 17, 2007, 20 pages.

* cited by examiner

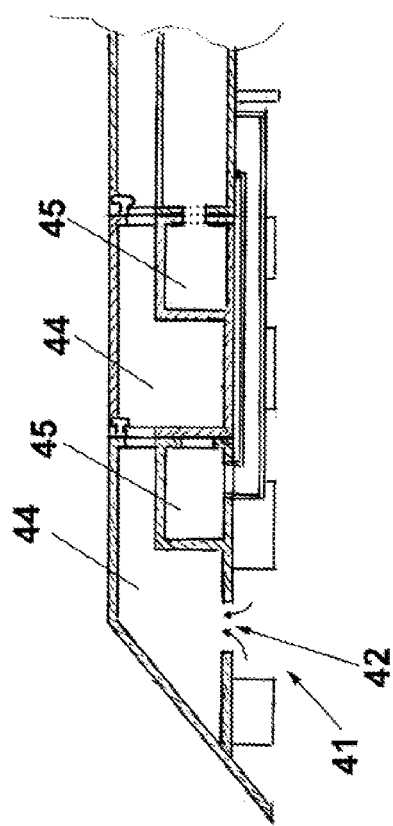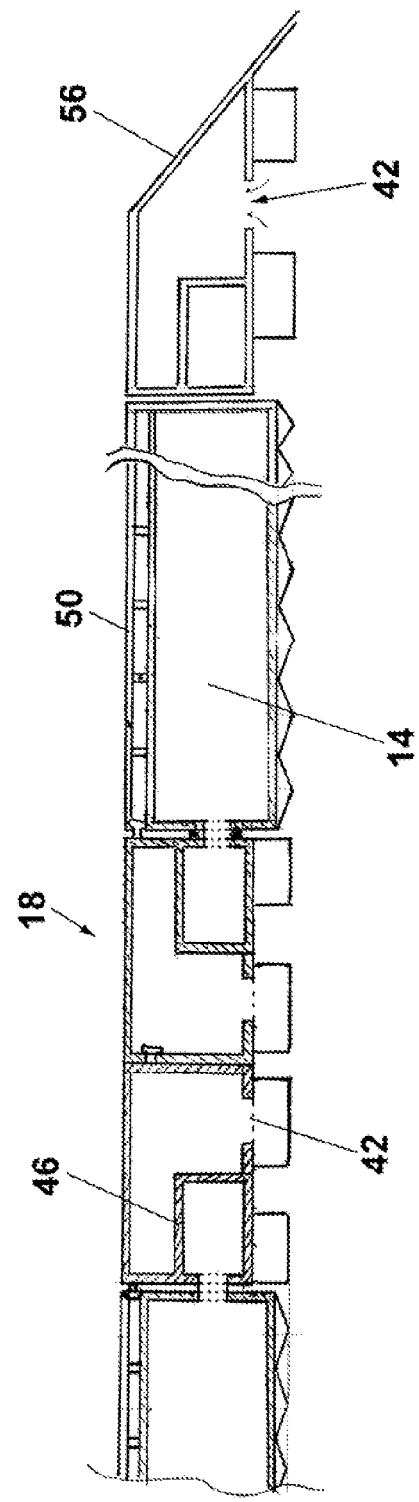

VERSATILE FLEXIBLE MAT AND METHOD OF IMPLEMENTING AND USING SAME

FIELD OF THE INVENTION

The field of the present invention is ice and snow melting mats, and particularly a versatile mat with advanced ice and snow melting and surface drying characteristics, among others.

BACKGROUND OF THE INVENTION

Ice and snow are major enemies of home and business owners across the United States. After every major snow storm, millions of people wake up in the morning only to find their garage doors and driveways blocked by piles of snow. Such cold early mornings start with shoveling of mountains of snow off the driveway, just to get to work. The result is tiredness, lateness to work, and greatly decreased productivity throughout the day. Similarly, countless businesses find their driveways and parking accommodations impassable for motorized and pedestrian traffic for days, and sometimes weeks, after a major snowstorm. All of these minor and major inconveniences translate into billions of dollars in lost profits for our economy. Furthermore, grave legal liability, resulting from slips and falls on wet and ice/snow covered sidewalks and stairwells, is known all too well to business and home owners across the United States.

The most common ways of battling the menace of ice and snow is by physically breaking and shoveling it away from stairs, entrances and passageways. This process is extremely laborious and time-consuming. Old people, young people, and those with imperfect health are often unable to perform this task at all. Gas-powered snow-cleaners exist. But these devices also require considerable effort and skill to operate, can be dangerous to people and animals and destructive to surfaces. Furthermore, much like shoveling, cleaning with gas-powered snow cleaners does not remove the snow, but only displaces it into piles on the side. These piles take weeks to gradually melt. Melted water from the piles, flows back onto sidewalks during the day and turns into solid slippery ice overnight.

Furthermore, attempts to mechanically remove the snow during continuing snowfall are almost always doomed to failure. New layers of falling snow cover the cleaned surfaces within minutes, requiring repeated cleanings. In high traffic areas, additional snow will be brought in on shoe soles and vehicle tires.

Snow and ice-covered surfaces are often treated with sand or salt to reduce slipperiness and melt the precipitation. However, the effects of such treatments on slipperiness are often short-lived, as particles of salt and sand are covered by new precipitation, or frozen into the existing snow and ice. The melting effect is limited to situations when quantities of ice and snow are relatively small and ambient temperature is not much lower than 32 degrees Fahrenheit. The salt and other impurities added to snow, melt it by lowering the melting temperature of water. Thus, if the temperature is significantly lower than 32 degrees Fahrenheit, little if any snow will melt.

Furthermore, large quantities of salt and other chemicals used to melt ice during the winter have a significant negative impact on people and the environment. Salt on the road corrodes automobiles, bridges, and any other metal structures in the vicinity. Salt, sprinkled near houses attracts birds and wild animals, thus increasing the risks of animal-bourne illnesses, such as lime disease. Salt interferes with the growth of vegetation. Salt gets into the ground water and contaminates water supply. Salt is not an ideal deicer.

Another solution to keeping stairways, walkways, and roadways of houses and businesses free of ice and snow, involves the use of under-the surface electrical heating coils. The coils are usually built into the infrastructure or, installed under the stones of walkways. In either case, the installation costs are significant, access is limited, and maintenance of the coils, permanently installed under the surface, is troublesome. The amount of electrical energy, required to heat through and maintain the heat in layers of surface stone is extremely high. The problem of excessive energy use is exacerbated by the fact that under-the-surface coils heat not only the surface above them, but also the ground below. This leads to significant loss of efficiency and, as a result, high energy costs.

A less expensive alternative to under-the-surface heating is in melting mats that are placed flat over the precipitation-covered surface to melt the layers of ice and snow from the top down. Such melting mats usually also comprise electrical heating coils embedded within the mat material. However, such mats exhibit some shortcomings.

For example, heat distribution from heating coils is often uneven. Snow directly under the coils melts faster than that located between the adjacent coils. Since such mats are placed directly on the snow, there is little or no escape for the melted water. There is no circulation of warm water or air over the surface or between the layers of ice and snow. Melting is slow, occurring layer by layer from the top down.

Puddles of cold melted water gather in ditches formed directly under the coils, absorbing the heat and slowing the melting process. Often, such mats are placed in locations, such as under curbs, doorsteps, low lying walkways, and other places, where melted water can not easily escape from the mat. In time, the mat positioned in such a location, will become submerged in a puddle of water. If there are any breaks or tears in the mat's insulation, the water accumulating under or over the mat will cause short circuits, destroying the device and posing significant electrocution risks to users and passers-by.

If snow under the conventional melting mat has successfully melted and the mat is removed, the surface underneath it will be in less-than perfect condition for pedestrian traffic. The surface will be wet and slippery, leading to slips, falls and law suits for businesses and home owners.

Also, much of the heat in over-the-surface mats is lost to the cold air above the mat. Usually both sides of the mat conduct heat. On one hand, double-sided heating is convenient to simultaneously melt the snow below the mat and the snow falling onto the mat from above. However, when there is no immediate snowfall, such double-sided heating results in expensive loss of energy and waste of the efficiency of the mat. To conserve energy and increase efficiency, the mat must have selectable modes for melting the snow above, the snow below, or both simultaneously.

In light of the problems associated with traditional ice melting methods and limitations associated with prior art devices, there is a long-standing and unsatisfied need in the art for a flexible and all-surface adaptable ice melting mat. This mat must be relatively simple and inexpensive to produce and easy to operate. The mat must be safe for pedestrians, allowing for walking upon its surface during use, without presenting the dangers of slippage or electrocution. It must be environmentally-safe and function effectively without releasing any harmful chemicals into the environment. It must be capable of melting ice and snow evenly, quickly and efficiently, with minimal energy expenditures. It must be capable of melting the precipitation below the mat, as well as the snow falling onto the mat from above. The device must also be capable of disposing of, recycling, or evaporating the liquid melt that results from the melting of ice and snow, leaving the surface clean and dry. The present invention achieves all of these objectives and provides numerous additional benefits.

SUMMARY OF THE PRESENT INVENTION

The present invention is defined by the following claims and nothing in this section should be taken as a limitation on those claims.

The versatile flexible mat of the present invention comprises a plurality of sections. Each of these sections comprises a tube. This tube is capable of conducting at least one type of melting medium, such as warm air or water, and comprises at least one jet (and preferably a combination of multiple jets) for releasing the melting medium. In some preferred embodiments of the present invention, at least some of the melting substance, released by the at least one jet is released into the closed space between the ceiling and the precipitation-covered surface, to effect the melting and/or evaporation of the precipitation from the precipitation-covered surface.

At least one arch rib is connected to the tube. The arch rib extends from the tube towards the arch rib of a neighboring section. The arch ribs extending from the neighboring sections are flexibly connected to each other, thus forming a flexible ceiling and a closed space above the precipitation-covered surface. The upper surfaces of the arch ribs form upper surface of the mat and, the lower surfaces of the arch ribs form lower surface of the mat.

In the preferred embodiment, the arch ribs, extending from the neighboring sections, each extend towards one another at an upward-pointing angle thus forming a centrally-raised flexible ceiling in the form of an arch/vault/dome over the precipitation-covered surface. Such centrally-raised ceiling facilitates the distribution and provides for better circulation of the melting medium in the closed space. This, in turn, allows for better distribution of heat and faster and more even melting of ice and/or drying of the surface.

Some preferred embodiments of the mat further comprise at least one (and preferably more than one) mashing member. The snow-mashing member is usually attached to the lower surfaces of the arch ribs, and extends downwards therefrom. The at least one snow-mashing member is primarily designed to apply pressure to and increase the surface area of ice and snow, thus facilitating the melting process. In the preferred embodiments, the mashing member comprises mashing surface covered with ribs or spikes. The mashing member may also provide additional frictional support for the mat, preventing movement, if the mat is positioned on slanted or slippery surfaces.

In some embodiments, the mat also comprises a drainage mechanism for pumping out the melted precipitation and/or the dissipated melting medium from the vicinity of the mat. The pumped-out precipitation and/or the dissipated melting medium may then be disposed of or reused in the mat for increased efficiency.

The method of using the mat is also described and claimed.

BRIEF DESCRIPTION OF THE DRAWINGS

FIG. 4 is a transverse section of the main pipes, taken on line 4-4 of the device of FIG. 3.

FIG. 5 is a transverse section of the preferred embodiment of the versatile flexible mat of the present invention, taken on line 5-5 of the device of FIG. 3.

DETAILED DESCRIPTION OF THE PREFERRED EMBODIMENT

Figure 1:
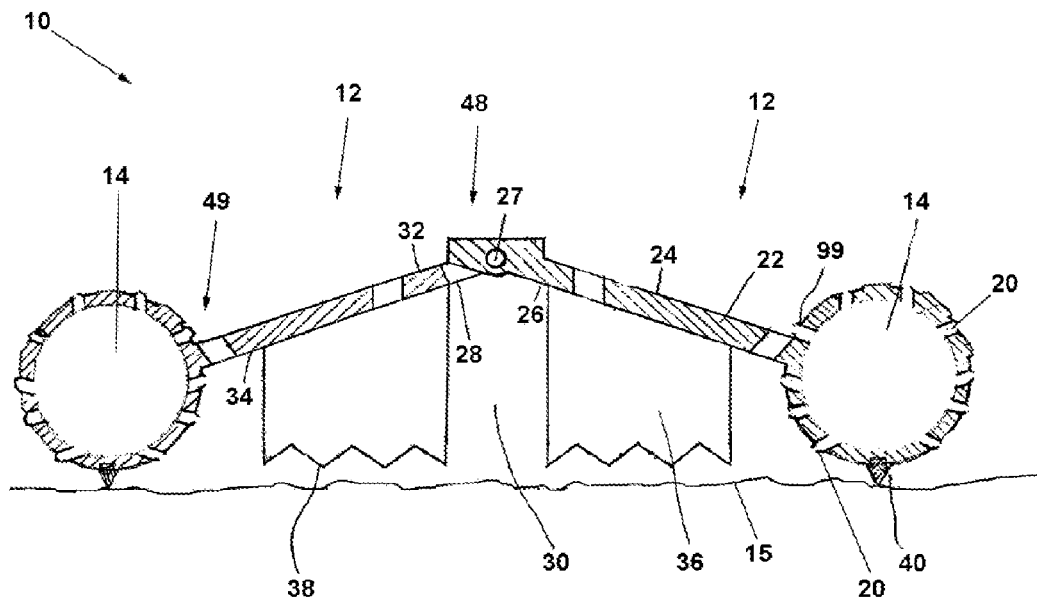
FIG. 1 is a cross-sectional view of two joined sections, of the mat of the present invention.

The apparatus of the present invention will now be illustrated by reference to the accompanying drawings. Preferred embodiments of the mat of the present invention have been assigned reference numeral 10. Other elements have been assigned the reference numerals referred to below.

The versatile mat of the present invention is also referred to as the mat 10 or the mat system 10. In the preferred embodiment of the invention, the mat 10 is designed for melting and elimination of ice and snow, and for subsequent drying of surfaces. The versatile nature of the invention also allows for numerous other uses, some of which are discussed below.

The mat 10 comprises a plurality of sections 12 (see FIG. 1), also referred to as sections 12, or singularly referred to, as section 12. Each section 12 comprises a tube 14, also referred to as tube segment 14 (see FIG. 1 and FIG. 3). The tube 14 is capable of conducting at least one type of melting medium 33 therethrough.

The "melting medium" 33, is a broad term, referring, in the preferred embodiment of the present invention, to substances and combinations of substances that may be used to melt snow or ice, including such substances as warm water and substances that may be used to dry surfaces, such as warm air, or combinations of both. In the preferred embodiments, the melting substances are pure and environmentally safe, such as warm air, steam, tap water, or recycled melted water, for example. However, in other embodiments, the melting substance, such as warm water may comprise various additives or impurities, that chemically or mechanically facilitate the melting of ice and snow. Some examples of such additives include (but are not limited to) alcohol, dissolved salts, or even sand particles.

It should be noted that the term "melting medium," as used in the claims, also refers to substances that are not necessarily used to melt ice or snow. For example, in one of the methods of using the preferred embodiment, the mat 10 is first used to melt ice and/or snow from the surface, employing the melting medium comprised of warm water and/or air. The mat then acts as a dryer, employing air streams to evaporate the moisture from the surface. In such a use, the air is also referred to as the "melting medium," even though it is not employed for the purposes of melting of ice and snow. Similarly, the "melting medium" 33 may be used to simply warm or hydrate the ground surface 15 under the mat.

The term "ground surface," as used in this specification refers to the surfaces to be affected by the function of the mat 10. The term most often refers to the ice and/or snow covered surfaces. However, it may also refer to moist surfaces to be dried by mat 10, dry surfaces to be hydrated by mat 10, or surfaces to be otherwise effected by the functions of the versatile mat 10. The term "ground surface" is not limited in its application to soil surfaces, and may also refer to asphalt, wood, concrete, and other natural or man-made surfaces.

Figure 3:
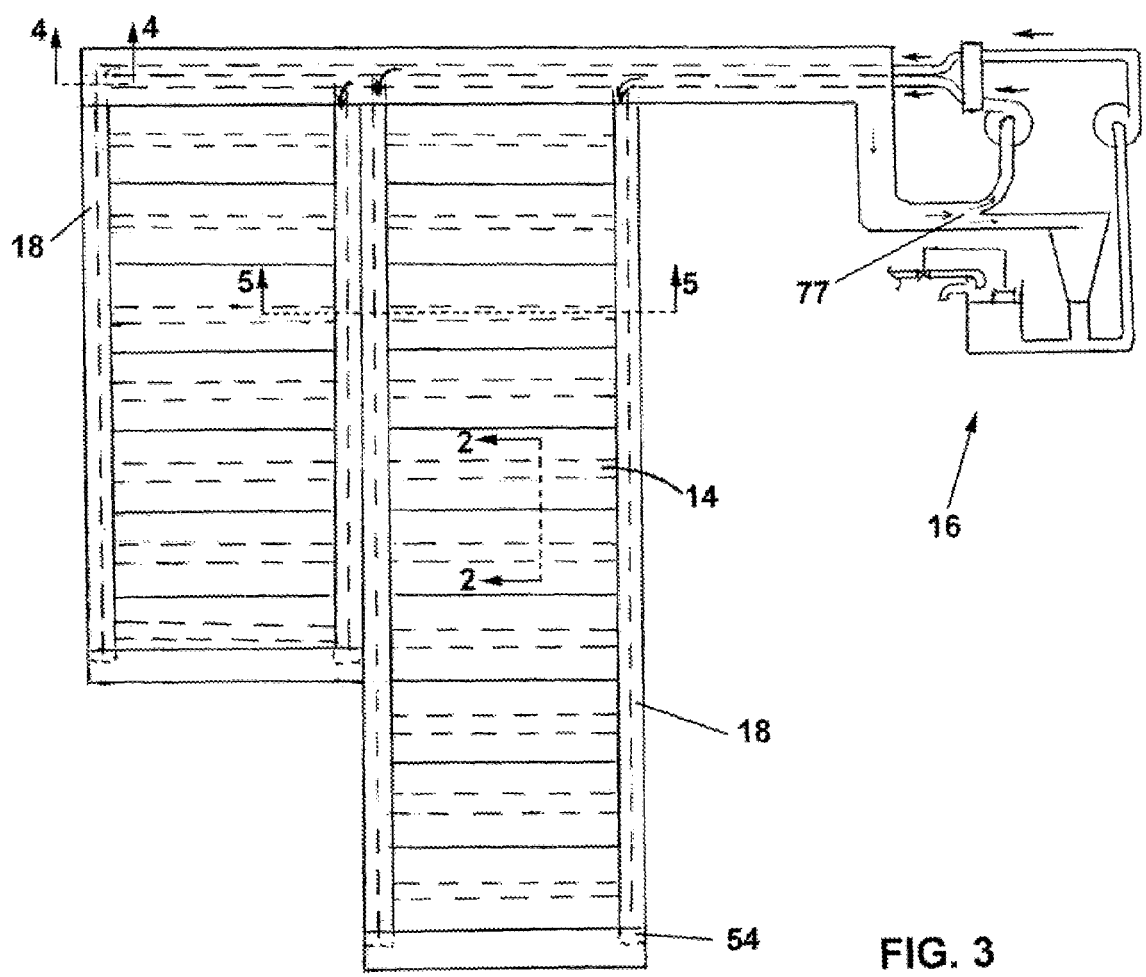
FIG. 3 is a top view of the preferred embodiment of the versatile flexible mat of the present invention.

In the preferred embodiment, the movement of the melting medium inside the tube 14 is facilitated by the pump 16 (shown on FIG. 3). Preferably, the pump 16 is an electric pump. The pump 16 may be integrally built into the mat 10, or (preferably) be an external device, disconnectably connected to the mat 10. In some embodiments, the pump 16 pumps the melting medium directly into the tube 14. In the preferred embodiment, the mat 10 comprises at least one, and preferably two or more main pipes 18 (shown on FIG. 3). In such an embodiment, tube 14 of each section is a branch of one or more of the main pipes 18. In this embodiment, the pump 16 pumps the melting medium directly into the at least one main pipe 18. Some or all of the melting medium flow, traveling down the main pipe 18 branches off into one or more tubes 14.

It should be noted that in some embodiments of the mat 10, the use of pump 16 is not required. For example, where the melting medium is tap water, the mat 10 may be attached to a faucet by a length of hose. In such an embodiment, the movement of the melting medium is facilitated by the water pressure in the faucet.

The tube 14 comprises at least one, and preferably a plurality of jets 20 for releasing the melting medium 33. The term "jet" refers to any structure capable of releasing the melting medium from the tube 14. In simplest of the preferred embodiments of the invention, the jet 20 is a slit or a small aperture in the tube 14, allowing the melting medium to "leak" from the tube 14. In more complex embodiments, including some preferred embodiments, the jet 20 is a pulverizer nozzle, with adjustable modes (from stream to spray, to fine mist mode, for example), with rotatable head adjustment, similar to that found in garden hose attachments and most massaging shower heads and shower jets. In some embodiments, the jets may be attached to the tube 14, using the ball and socket connection, wherein the jet attached to the ball rotates within the socket attached to the tube 14, thus allowing for aiming of the jets 20.

Each section 12 of the mat 10 comprises at least one arch rib 22. In the preferred embodiment, the arch rib 22 is comprised of semi-rigid, flexible material such as plastics. In other embodiments, the arch rib 22 may be comprised of rigid materials, such as metal. The arch rib 22 is connected (preferably flexibly connected) to the tube 14 and extends from the tube 14, towards the arch rib 22 of a neighboring section. Each arch rib 22 comprises an upper surface 24 of the arch rib 22 and a lower surface 26 of the arch rib 22.

The arch ribs 22, extending from the neighboring sections are flexibly connected to each other. In the preferred embodiment, the flexible connection is achieved by hinged connection 27, connecting the two arch ribs. However many other types of flexible connections, known to those skilled in mechanical arts, may be utilized. In some embodiments, the connection of ribs 22 to the tube 14 may be flexible (i.e. hinged, etc) as well.

The number of the arch ribs 22 that each section 12 comprises depends on the number of connections that each section 12 has with other (neighboring) sections 12. For example, the section 12 positioned on the edge of the mat 10 may be connected to one other section 12, while the section 12 positioned in the middle of the mat 10 be connected to two or more sections 12, adjacent to it.

The arch ribs 22 of adjacent/neighboring sections 12, connected to each other, form a flexible ceiling 28 and a closed space 30, (or a chamber 30), above the ground surface 15. The upper surfaces 24 of the adjacent arch ribs 22, said ribs 22 being flexibly connected to each other, form upper surface 32 of the mat 10. The lower surfaces 26 of the adjacent arch ribs 22, said ribs 22 being flexibly connected to each other, form lower surface of the mat 34.

Figure 2:
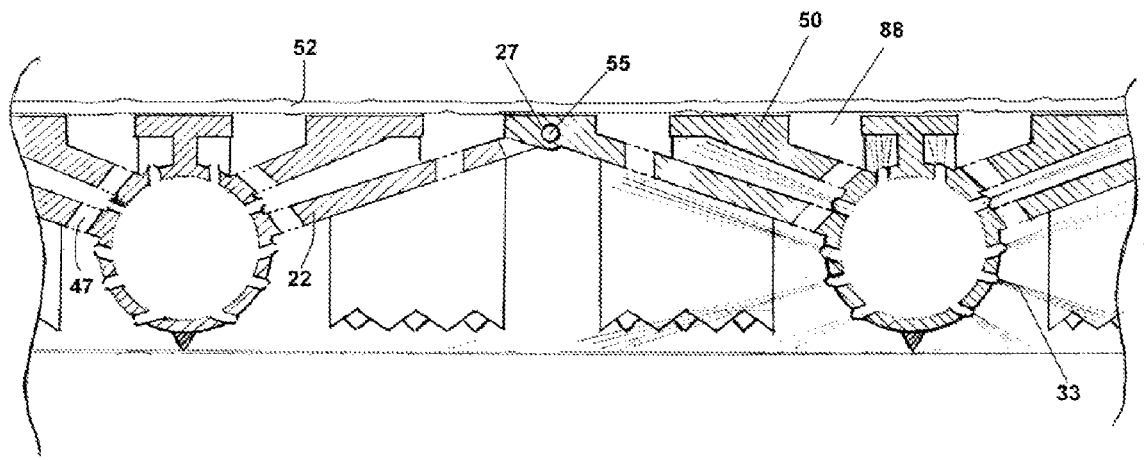
FIG. 2 is a cross-sectional view of the preferred embodiment of the versatile flexible mat of the present invention, taken on line 2-2 of the device of FIG. 3.

In the preferred embodiments, the arch ribs 22, extending/projecting from the neighboring sections 12, each extend or project from the tube 14 towards the arch rib 22 of a neighboring section 12, at an upward-pointing angle (see FIG. 1 and FIG. 2.). Such projection at an upward-pointing angle allows the flexible ceiling 28 of the preferred embodiments to be centrally-raised, forming an arch (meaning, the likeness of an arch, a vault, or a dome) over the ground surface 15.

The centrally-raised shape of the ceiling 28 provides ample room for, and facilitates even distribution and circulation of the melting medium in the closed space 30. When there is pedestrian or vehicular traffic over the upper surface 32 of the mat 10, a downward force is applied to the centrally-raised ceiling 28. As a result of the downward force, the flexible ceiling 28 flexes downwards, thus reducing the size of the closed space 30. Some of the melt (i.e. water melted from ice and snow, used/ejected melting medium, air above it, etc.) contained in the closed space 30 is thus forced out of it into the neighboring closed spaces 30, thus redistributing the melting medium under the entire mat, and contributing to even melting. In some embodiments, the flexible ceiling 28 may flex far enough under the downward force of traffic, to apply some pressure to the surface to be affected. Such mechanical pressure, applied to the snow-covered surface, speeds up the melting of ice and snow.

To enhance the mechanical snow-melting effects from the flexing of the ceiling 28 under the weight of traffic, the preferred embodiments of the mat 10 comprise at least one, and preferably many, snow-mashing members 36. The term "snow-mashing member" refers to a multitude of simple mechanical devices that may be positioned between the flexible ceiling 28 and the surface to be affected by the mat 10. The snow-mashing members act to convey the flexing of the ceiling 28 into mechanical downward pressure on the ice and snow below. In the preferred embodiment, depicted on FIG. 1 and on FIG. 2, the snow-mashing members 36 are attached to the lower surface 26 of the arch rib 22, and extend downwards therefrom. However, the mashing members 36 may be attached to other moving surfaces between the lower surface of the mat 34 and the ground surface 15, and even placed directly onto the ground surface 15. The mashing members 36 are constructed of rigid durable material, preferably capable of withstanding ice-crushing pressures. Suitable materials include metal, strong plastics, or even wood. Materials such as wood or plastic are preferred over metal, particularly for the lower surface of the snow-mashing members 36, to avoid the risk of scratching the asphalt, or other surface covering under the ice and snow.

The lower surface of the snow-mashing members 36 preferably comprises sharp edges 38 (also referred to as multiply-edged surface 38). In the embodiment of FIG. 1, these sharp edges are in the form of several spikes, on the lower surface of the wide snow-mashing members 36. In other embodiments, snow-mashing members 36 may be much narrower than those shown in FIG. 1 and FIG. 2, and even be in the form of numerous ice picks or needles, extending from the lower surface 26 of the arch ribs 22. In the preferred embodiment, the sharp edges are not razor-sharp, so as to be safe for the user and asphalt underneath the snow. Their main function is not necessarily to cut through solid ice, but rather to apply pressure to select points on the frozen surface, accelerating the melting process at these points. The indentations created by the mashing members 36 in the ice and snow, increase the surface area of the latter, allowing for better penetration of the melting medium. When the ice and snow have weakened from the pressure and the effects of the melting medium, the mashing members 36 break up the weakened ice and mash it into the fast-melting paste. Such mashing-member-accelerated melting, results in decreased energy consumption by the mat 10.

The function of the mashing members 36 is not limited to facilitating the melting of ice and snow. For example, in some instances the versatile mat 10 may be used to hydrate or warm up the surfaces, such as the soil, prior to planting of seedlings. In such circumstances, mashing members 36 can act by tilling the soil. The tilled, or mashed-up soil is much more susceptible to warming and/or hydration by the mat 10, thus reducing the required time and energy consumption. The tilling work of the mashing members 36 (activated by traffic over the flexible ceiling of the mat 10) also prepares the soil for planting, alleviating the need for dedicated tilling of soil later on.

The mashing members 36 also act to prevent sliding and skidding of the mat 10 on slippery or slanted surfaces. For example, it is foreseeable that smaller versions of the mat 10 may be placed on ice-covered porch steps for de-icing. When someone steps onto a mat, positioned on the step that has not been de-iced yet, there is a risk of a mat slipping under the weight and inertia of a moving body. Similarly, driveways are often slanted to allow for water run-off. When a mat is placed on such a slanted driveway, covered with ice, it may slide down the hill, much like a sled, under the weight of the vehicle and the power of gravity. However, in the preferred embodiments of the mat 10, where the mashing members 36 are present, any significant weight (such as that of a person) on top of the mat, forces the flexible ceiling 28 to flex. The flexing causes the mashing members 36 to dig into the icy or snowy surface, holding the mat in place. The force with which the mashing members dig into the surface below is directly proportional to the force exerted by the mass above. Thus, the heavier the object above is, and consequently, the more likely it is to accidentally move the mat, the stronger the mashing members 36 hold.

In the preferred embodiment of mat 10 displayed on FIG. 1, the mashing members are integrally attached to the lower surface of each arch rib 22, and are extending downwards therefrom. However, in other embodiments, the mashing members 36 may be removably attached. Much like the integrally-attached mashing members 36, such removable members 36 may extend over the surface to be affected vertically, hanging from the lower surface of the arch rib, suspended between the arch rib 22 and the ground surface 15, flexibly attached to the tube 14, for example. The removable mashing members 36 may be removably attached in the closed space 30, using a variety of attachment methods, well known to those skilled in mechanical arts. For example, in one such embodiment of the present invention, the mashing member 36 comprises a male threaded fastening screw in its top part, and the lower surface 26 of the arch rib 22 comprises a female threaded fastening socket for accommodating the fastening screw of the mashing member 36. Alternatively the mashing member 36 may comprise rails that slidably fit into and lock in the rail grooves on the flexible ceiling. Numerous other attachment methods known to those skilled in mechanical arts may be applied.

The user of the mat 10 may want to remove the mashing members 36 in certain circumstances. For example, they may be removed to prevent any chance of scratching the asphalt underneath the snow. They may also be removed to improve the circulation of the melting medium in the closed space 30, especially if traffic on the mat, needed to activate the mashing members 36 is not expected. The mashing members may also be removed if the snow has melted and the mat is required only for drying of puddles, or when the mat is required for maintaining the optimum heat and moisture for proper drying of the freshly-poured concrete.

Some embodiments of the present invention, including the embodiments shown on FIG. 1, and FIG. 2 comprise at least one abutment tooth 40, and preferably numerous abutment teeth 40. The abutment teeth 40 are attached to and extend vertically towards the ground from the tube 14. In combination with the mashing members 36, or by themselves, the abutment teeth 40 prevent the mat 10 from skidding over the ground surface 15. For secure anchoring of the mat 10 in place, the abutment teeth 40 may be forced into the soft ground or frozen surface below by stepping on or applying force over the areas of the mat 10 directly over each abutment tooth 40.

On hard surfaces, the abutment teeth 40 act to raise the tubes 14 and, correspondingly, the entire structure of the mat 10 above the ground surface 15. This allows the melted ice and snow, as well as the used melting medium, to escape from under the mat 10. In some embodiments of the mat 10, the length of the abutment teeth 40 is adjustable. One way to achieve this is by mounting each abutment tooth 40 into the threaded socket on tube 14. This allows the user to rotate each abutment tooth 40 to adjust the height of the mat 10 or unscrew each abutment tooth 40 out of the mat completely.

Depending on topography, surrounding the mat, the melt does not always escape from under the mat by itself, even if abutment teeth 40 raise the mat to allow sufficient clearance for water escape. If surface under the mat is uneven or concave, the melt will gather in cold puddles under the mat, slowing the melting process by soaking up heat energy, slowing the melting process, and preventing the surface from drying. Worse yet, if the mat is positioned in a low point, with slopes on the sides, or on thick snow, the water from the snow melting under the mat, and water melting from the heat of the mat on nearby snow-covered slopes will literally flood the mat, leaving it floating or sunken on the bottom of a small lake. To prevent this from happening, the versatile mat of the present invention comprises a drainage system 41 for pumping out the melted precipitation and/or the dissipated melting medium from the vicinity of the mat.

The drainage system 41 comprises the at least one, and preferably several suction drainage intakes 42, also referred to as drainage intakes 42 (See FIG. 4). In the preferred embodiment of FIG. 4, the drainage intakes 42 are in the form of holes, strategically positioned on the mat 10, in places of the likely accumulation of the melted water. One such place for positioning of drainage intakes 42 in the preferred embodiment is on the lower surfaces of the main pipes 18 (See FIG. 4). Other suitable locations include the lower part of the tube 14, on the mashing members 36 and on the upper surface 24 of the ribs 22, and other areas, where moisture is likely to accumulate. In some embodiments of the invention, some or all drainage intakes 42 may comprise flexible (preferably rubber) hoses, which may be manually aimed by the user to the points of most likely melt accumulation.

In the preferred embodiments, the mat 10 comprises a plug or a valve, associated with each drainage intake 42. Such a plug or a valve may be used to plug or close some or all of the drainage intakes 42. Closing some of the drainage intakes 42 can be useful to increase the suction of the other, open drainage intakes 42. For example, if the mat 10 is positioned on a slanted surface, most of the melt will flow toward the lower edge of the mat. Accordingly, the suction of the drainage intakes 42, positioned on the side of most likely drainage accumulation should be enhanced by closing or plugging of all unnecessary drainage intakes.

Similarly, some of the jets 20 may be plugged or closed in the areas of the mat 10, where they are unnecessary, to improve the pressure of the jets, or to eliminate the waste of the melting medium 33.

In the preferred embodiment, a drainage conduit 44 (See FIG. 4) connects the suction drainage intakes 42 to the drainage pump. The drainage conduit 44 of the preferred embodiment is a conduit, inside of the main pipe 18. As the main pipe 18 also conducts the melting medium from the pump 16 (or some other melting-medium movement-facilitating device, such as the water faucet) to the plurality of jets 20, the two distinct flows (that of the melting medium towards sections 12 and that of melted water away from sections 12), are separated by an impermeable wall 46, as shown on FIG. 4. The drainage conduit 44 takes up a larger area within the main pipe 18 of the preferred embodiment, than the melting medium conduit 45, since greater pressure is generally required in the melting medium conduit 45 to ensure proper functioning of the jets 20. In other embodiments, the drainage conduit 44 may be contained within a separate tube, running inside the main pipe 18. The drainage conduit may also be positioned outside the main pipe 18. The latter modification may be useful in embodiments where the draining conduit conducts the ice melt/used melting medium for disposal away from the mat (i.e. into the gutter, for example).

In the preferred embodiment of the present invention, at least some of the melt from the vicinity of the mat, collected by the drainage intakes 42, is channeled/reintroduced through the drainage conduit 44 into the melting medium conduit 45, or (alternatively) into a melting medium tank for mixing in with the melting medium, for recirculation/reuse in melting of ice and snow. However, in some embodiments (particularly where the melt is discarded) the drainage pump may be a pump separate from the pump 16. In preferred embodiments, where the melt is recirculated, the melt may be reheated and mechanically filtered to separate any debris on the way to the pump 16. The filters and/or heaters may be external or comprise an integral part of the drainage conduit 44. In one embodiment, shown on FIG. 3, the melt is filtered and separated in the water or air filter, built into the pump 16. After the melt is filtered and/or heated, it is channeled back into the melting medium conduit 45 (or a melting medium storage tank), for mixing in with the melting medium.

The recirculation of the melting medium is particularly effective where the melting medium is warm air. The warm air, taken up by the drainage intakes 42 from the closed space 30 and the vicinity of the mat 10 is generally warmer than atmospheric air. Thus less energy is required to heat it up for reuse in the mat 10. In general, for melting of ice and snow, the warmer the initial temperature of the melting medium, pumped into the mat is, the faster the melting occurs and/or the less energy will be expanded by the mat in heating the melting medium. Thus, in embodiments of the mat, where the melting medium is air, it may be preferable to draw the air from such warmer sources as the house, garage, or even exhaust pipe of an automobile, instead of the cold winter atmosphere, surrounding the mat.

The recirculation of the melting medium in the mat 10 may be selective. For example, the melt that the drainage intakes 42 take in may include some water and relatively warm air from the closed space 30. Once inside of the drainage conduit 44, heavier water will, by itself, separate from the lighter air, with water taking up the lower part of the drainage conduit 44, and air taking up the top. The air itself will separate, according to warmth, with warmest air being toward the very top of the conduit. In some instances, where the melt contains many contaminants, or in situations where the pumped in water can not be reused in the mat (i.e. when the mat is functioning in surface drying mode), the water, running down the lower part of the conduit can be easily channeled away for disposal, while the warm air in the top part of the conduit continues to travel through the conduit for recycling. Numerous ways to achieve the separation are well known to those skilled in mechanical arts. The liquid can be allowed to sift through the floor of the drainage conduit 44 and channeled away from the mat. Another simple (and preferred) way to recapture the warm air is by channeling the melt through the Y-shaped tube 77 (See FIG. 3), with one of the prongs pointed up, and another prong pointed down. The heavy water, along with heavier colder layers of air will travel down the lower prong and can be channeled away from the mat, while the warmer air will continue along the conduit for recirculation.

Some of the preferred embodiments of the mat 10 can use more than one type of the melting medium simultaneously, or switch between different types of the melting medium. For this, the mat 10 comprises a routing mechanism, for selecting and routing the selected type of the melting medium through the tube 14 and ultimately through the jets 20. For example, the mat 10 can be simultaneously connected to the water faucet and to the pump 16, pumping air. The routing mechanism, which may be in the form of a manually-operated switch valve, may be used to channel the selected melting medium or a combination of melting mediums through the melting medium conduit 44.

In some embodiments, the routing mechanism is programmable to automatically switch the type of the melting medium routed through the tube. Such embodiments may comprise a timer, which functions to automatically switch the routing mechanism to the off position (stopping the release of the melting medium), or to a different melting medium release setting, after a preset period of time. The advantage of such a device is in that it can function in several preprogrammed modes. One example of such mode may be a "melt and dry" mode. In this mode, the routing mechanism first releases a melting medium with high heat/melting capacity, such as hot water through the jets 20 to melt the ice and snow underneath. After a set period of time (or following the manual switch), when most of the ice has melted, the release of hot water stops, and the routing mechanism activates the release of hot air (i.e. another melting medium) from the jets 20. The hot air melts the remaining snow and dries the ground surface 15 underneath. When the ground surface 15 is clean and dry, the timer switches the routing mechanism to stop the release of any melting medium, thus shutting the mat down.

Instead of a timer, a sensor may be used to activate the routing mechanism of the mat 10. The sensor is preferably a temperature sensor, monitoring the temperature of the melt. The temperature of the melt rising above 32 degrees Fahrenheit (0 degrees Celsius), can be interpreted to signal that most of the snow and ice has melted, and that most of the melt below, is water. Such a reading by the sensor triggers the routing mechanism to release warm air as the melting medium, to dry out the surface. Concurrently, the sensor may also activate or intensify the function of the drainage intakes 42 when most of the snow has melted to water.

In simple embodiments of mat 10, several different types of melting medium (such as air and water) travel through the same conduits (tubes 14 and main pipes 18) and are released through the same jets 20. In more complex, preferred embodiments, each type of the melting medium travels through dedicated conduits. The routing mechanism and the associated controls may be directly on each tube 14, on each main pipe 18, or on the pump. The controls may be activated and adjusted, using a remote control unit.

In more complex embodiments of mat 10, where each type of the melting medium travels through dedicated conduits, there may be a separate main pipe 18, tube 14, and a plurality of jets 20 dedicated for distributing liquid melting mediums, and a separate pipe 18, tube 14, and the plurality of jets 20 dedicated for distributing warm air. A separate system may also be added for distributing solid melting mediums, such as dry salt or sand. In such a system, there may be a separate routing mechanism for each dedicated conduit, and/or a joint control for selecting which dedicated conduits (i.e. the dedicated conduits for which type of medium) are turned on, and which are turned off.

The advantage of the more complex embodiments, with dedicated conduits for each melting medium, is the capability of releasing two types of the melting medium simultaneously. Such capability is particularly useful for melting of accumulated snow during the snowfall. For efficiently melting the layers of ice and snow on the ground, a melting medium with high heat capacity, such as water is preferred. However, during the snowfall, some ice and snow will also tend to accumulate on top of the mat 10, creating safety hazards. Such accumulations from the top of the must be removed contemporaneously with melting of the accumulations below. Thus, melting medium must be dissipated over the upper surface 32 of the mat 10 contemporaneously with the melting medium being distributed under the lower surface of the mat 10. Warm water is not very suitable for melting the gradually accumulating snow on the upper surface 32 of the mat 10, since is can create more slipping problems and inconveniences than it would cure. On the other hand, warm air, strategically distributed over the upper surface of the mat, both, melts the snow and dries the surface of the mat. Thus, the simultaneous release of two types of the melting medium, hot water below and warm air above, is preferred.

In the beginning of the snowfall, when there are no accumulations of precipitation on the ground yet, the mat may be laid out with only the top (air-blowing) function activated, to prevent any accumulation of precipitation on top of the mat. Alternatively, during the spring snow melting, or after the rain, the mat may be placed over the wet surfaces, with warm air pumped through the melting medium conduits and jets 20 (preferably pointed to the ground), for evaporating the moisture from the ground surface.

To provide for better protection against snow accumulation on top of the mat, for better drainage of moisture from the top of the mat, and to create better surface friction for traffic over the mat, the preferred embodiment of mat 10 comprises a plurality of apertures 47 (see FIG. 2), running from the upper surface 32 of the mat 10, all the way through the flexible ceiling 28 and into the closed space 30. The apertures 47 are preferably positioned at the lowest points of the upper surface 32 of the mat 10, so as to allow the runoff of precipitation and melted snow from the surface into the closed space 30. Once inside of the closed space 30, the moisture will be drained by the drainage system 44 and/or channeled away from the mat, as described above. Some jets 20, positioned below the flexible ceiling 28 may be aimed to blow the melting medium (such as warm air) directly through the apertures 47 to create upward streams of warm air above the mat and to divert the falling snow and to prevent the clogging of apertures 46 with ice and snow. When the mat 10 is used only for melting of ice and snow below the mat, the apertures 46 may be plugged to prevent the escape of the melting medium from the closed space 30.

As mentioned above, in all preferred embodiments, the at least one jet 20 is a combination of multiple jets 20. At least some of the jets 20 are positioned below the flexible ceiling 28 and oriented to dissipate the melting medium into the closed space 30 between the flexible ceiling 28 and the ground surface, to effect the melting and/or evaporation of the precipitation from the ground surface. Some of the jets 20 are aimed at low angle to the snow-covered surface to disseminate the melting medium over the larger area and to melt the top layer of the snow. Some of the jets 20 (especially those positioned higher from the ground on tube 14) are aimed at the snow at sharper angles to "burn" holes through the snow and to get under and loosen the lower layers of snow. Other jets may me aimed to warm the mashing members 36 or to circulate the melting medium within the closed space 30. As can be seen from FIG. 1 or FIG. 2, other jets 20, such as high jet 99 of FIG. 1, may also be positioned above the upper surface 32, to dissipate some of the melting medium over the upper surface 32 of the mat 10.

In the simpler of the preferred embodiments of the mat 10, such as the one shown in FIG. 1, the upper surface 32 is uneven, consisting of crests 48 and troughs 49, with the crests formed at the hinged connections 27 (the places of connection of two neighboring arch ribs 22), and the troughs formed at the place of connection of each arch rib 22 and the tube 14. Such uneven surface may create certain awkwardness for pedestrian traffic. Thus, the more complex preferred embodiment of FIG. 2 further comprises the plurality of the leveling ribs 50.

The leveling ribs 50 extend from the top part of each tube 14, as shown on FIG. 2 Preferably, the leveling ribs 50 extend to the height of the hinged connection 27, forming a flat level surface over some of the trough 49 and over the tube 14. The leveling ribs 50 can extend from each tube 14 directly upwards or at an angle, as can be seen from FIG. 2.

The leveling ribs 50 are preferably made of the same material (such as plastics) as the arch ribs 22. Preferably, distance of the gap 88 between two leveling ribs 50, or each leveling rib 50 and crest 48, is small enough, to prevent trapping of shoes in the gaps. For the same reason, it is preferable that the mashing members 36 (where present) are suspended only an inch or less above the snow-covered surface, so that the crest 48 would not travel more than an inch down, when stepped on. For protection of the mat, for walking safety or for aesthetic effect, a layer of the water-permeable material 52 (such as a mesh rubber mat) may be placed onto the flat level surface, created by the leveling ribs 50 and crests 48.

In the preferred embodiment of the present invention, the main pipes 18 run along the sides of sections 12, and along the sides of the mat, in the direction perpendicular to that of tubes 14, as shown on FIG. 3. The tubes 14 are attached to (preferably screwed onto) the pipes 18. Preferably, the main pipes 18 are somewhat flexible, being made of rubber or flexible plastics. In the preferred embodiment of the invention shown on FIG. 3, in addition to conducting the melting medium and the melt therethrough, the main pipes 18 also play a role in keeping the tubes 14 properly oriented as explained below. Whenever someone steps onto the upper surface 32 of the mat 10, the flexible ceiling flexes downward. This causes the arch ribs 22, making up the flexible ceiling to push against the tube 14, rotating or moving the tube 14 in the process. The flexible nature of the main pipe 18 allows for some movement/rotation of the attached tube 14, but returns the tube 14 to the preset position, once the downward force is removed. This return rotation of the tube 14, caused by the flexible main pipe 18, causes the flexible ceiling 28 and the mashing members 36 to rise to the initial position, thus retaining the overall shape of the mat 10. In other embodiments of the invention, various types of springs between two neighboring arch ribs 22, high memory materials, and other adaptations known to those skilled in mechanical arts may be used to retain the shape of the mat 10 after it has been stepped on.

Although on FIG. 1 and FIG. 2, only two sections 12 are shown for ease of illustration, most preferred embodiments of the mat 10 comprise numerous pairs of sections 12 connected together, as shown in FIG. 3. As previously described, the sections 12 are hingedly and flexibly connectable to each other by the tips of arch ribs 22, extending from the neighboring sections 12. Additional sections 12 can be added or removed to accommodate any length or width of the mat required.

To achieve expandability of the mat 10, in the preferred embodiment, the main pipe 18 comprises an extension port 54 for attachment of additional, extension pieces of the main pipe. Preferably, the extension ports are threaded for easy screwable attachment of the extension pieces. Thus, to expand the surface of the mat 10, the extension pieces are screwed onto or into the main pipes 18 at one or more extension ports 54. Additional sections 12, to be added, are then attached by the tubes 14 to the extension pieces. The newly-added sections 12 are then also connected to the neighboring sections 12 to form a continuous surface. This connection of sections 12 to each other is achieved in the preferred embodiment, by passing a single shaft 55 through the holes in the tips of the arch ribs 22 of both of the sections 12, thus creating a hinged connection. The shaft 55 is preferably made of rigid plastics or metal, but it may be made of any rigid or semi-rigid material.

The edges of the preferred embodiment of the mat 10 have a slanted, sloping form. Sloping edges allow vehicular traffic, such as cars, wheel chairs, and bicycles, easier access onto the mat. The sloping edge 56 of the main pipe 18, forming the edge of the mat 10, can be seen on FIG. 5.

The method of using the mat 10 of the present invention (also referred to as the method of applying the melting medium to the ground surface) comprises the steps of obtaining the mat 10, as described above, and positioning the mat over the ground surface (i.e. the surface to be affected, which may be a precipitation-covered or even dry ground, asphalt, or any other surface). At this stage the user may also adjust the size of the mat to cover the required ground surface by adding or removing sections 12 from the mat. The user then initiates the function of the mat 10 by initiating the flow of the melting medium through the melting medium conduit 45. This step may involve plugging in or otherwise switching on the pump 16, the water faucet, or some other source for pumping the melting medium through the mat 10. In embodiments, comprising the mashing members 36, the user may purposely walk on top of the mat 10 to activate the function of the mashing members and to speed up the effect of the melting medium. If the melting medium initially used is liquid, such as warm water, then, whenever the ice and snow on the ground surface have melted, the user may switch to a gaseous medium (such as warm air) for drying the remaining moisture from the ground surface.

It is to be understood that while the apparatus and method of this invention have been described and illustrated in detail, the above-described embodiments are simply illustrative of the principles of the invention and the forms that the invention can take, and not a definition of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

I claim:

1. A versatile flexible mat, comprising:
   a plurality of sections, wherein each section of the plurality of sections comprises:

a. a tube having a peripheral wall, capable of conducting at least one type of melting medium therethrough, said peripheral wall comprising at least one jet for releasing the melting medium;

b. at least one arch rib connected to the tube and extending from the tube, towards the arch rib of a neighboring section, said at least one arch rib comprising an upper surface of the arch rib and a lower surface of the arch rib, and wherein the arch ribs extending from the neighboring sections are flexibly connected to each other, thus forming a downwardly facing flexible ceiling and a closed space above the ground surface, and wherein the upper surfaces of the arch ribs, said ribs being flexibly connected to each other, form an upper surface of the mat and, wherein the lower surfaces of the arch ribs, said ribs being flexibly connected to each other, form a lower surface of the mat, and wherein at least some of the melting substance, released by the at least one jet is released into the closed space between the ceiling and the precipitation-covered surface, and wherein the arch ribs, extending from the neighboring sections, each extend from the tube towards the arch rib of a neighboring section at a wide upward-pointing angle, thus forming a centrally-raised flexible ceiling in the form of an arch over the precipitation-covered surface to facilitate the distribution of the melting medium in the closed space, and wherein the mat comprises at least one snow-mashing member, said at least one snow-mashing member connected to the flexible ceiling and extending vertically in the downward direction, and wherein said at least one snow-mashing member comprises substantially horizontal multiply-edged surface on it's lower end having a plurality of peaked protrusions.

2. The device of claim 1, wherein the mat comprises a plurality of the snow-mashing members, and
   wherein each of the at least one arch ribs further comprises at least one snow-mashing member, the at least one snow-mashing member attached to the lower surface of the arch rib, and said at least one snow-mashing member extend downwards from the lower surface of the arch rib.

3. The device of claim 2, wherein the melting medium is warm ater.

4. The device of claim 2, wherein the melting medium is air.

5. The device of claim 2, wherein the melting medium is steam.

6. The device of claim 2, wherein the melting medium is the combination of liquid water and air.

7. The device of claim 2, wherein the melting medium is water, containing snow-melting additives.

8. The device of claim 2, wherein the flexible connection of the arch ribs is the hinged connection.

9. The device of claim 2, wherein the at least one jet is a combination of multiple jets, wherein at least some of the jets of the combination of multiple jets are positioned, and oriented to dissipate the melting medium into the closed space under the ceiling.

10. The device of claim 9, wherein at least some of the jets of the combination of multiple jets are positioned below the height of the ceiling and oriented to dissipate some of the melting medium into the closed space under the ceiling, and some of the jets of the combination of multiple jets are positioned above the height of the ceiling to dissipate some of the melting medium over the upper surface of the mat.

11. The device of claim 10, wherein the mat further comprises a drainage system for pumping out the melt from the closed space and the vicinity of the mat, said drainage system comprising a drainage pump, a drainage conduit and at least one suction drainage intake, wherein the drainage conduit connects the drainage intakes to the drainage pump.

12. The device of claim 11, further comprising a melting medium conduit, and wherein the drainage conduit channels at least some of the melt, collected by the at least one suction drainage intake, into the melting medium conduit for mixing in with the melting medium.

13. The device of claim 2, further comprising at least one abutment tooth 40, said tooth attached to the tube.

14. The device of claim 1, further comprising at least one main pipe, attached to the tube, said pipe supplying the melting medium into the tube.

15. The device of claim 14, wherein the at least one main pipe comprises an extension port for attachment of additional, extension pieces of the main pipe.

16. The device of claim 1, further comprising a plurality of apertures, said apertures extending from the upper surface, through the flexible ceiling, and into the closed space.

17. The device of claim 1, further comprising a routing mechanism, for selecting and routing the selected type of the melting medium through the tube.

18. The device of claim 17, wherein the routing mechanism is programmable to automatically switch the type of the melting medium routed through the tube.

19. A method of applying melting medium to the ground surface, comprising the steps of A. Obtaining the flexible heating mat, comprising
a plurality of sections, wherein each section of the plurality of sections comprises:
   a. a tube having a peripheral wall, capable of conducting at least one type of melting medium therethrough, said peripheral wall comprising at least one jet for releasing the melting medium;
   b. at least one arch rib connected to the tube and extending from the tube, towards the arch rib of a neighboring section,
said at least one arch rib comprising an upper surface of the arch rib and a lower surface of the arch rib, and
wherein the arch ribs extending from the neighboring sections are flexibly connected to each other, thus forming a flexible ceiling and a closed space above the ground surface, and
wherein the upper surfaces of the arch ribs, said ribs being flexibly connected to each other, form upper surface of the mat and, wherein the lower surfaces of the arch ribs, said ribs being flexibly connected to each other, form lower surface of the mat, and
wherein at least some of the melting substance, released by the at least one jet is released into the closed space between the ceiling and the precipitation-covered surface;
B. Positioning the mat over the ground surface, thus suspending the flexible ceiling and at least mashing member having a plurality of peaked protrusions hanging over the ground surface;
C. Initiating the flow of the melting medium through the tubes.

\* \* \* \* \*